United States Patent
Stevens et al.

(10) Patent No.: US 11,489,159 B2
(45) Date of Patent: Nov. 1, 2022

(54) METHOD FOR PRODUCING A GRAPHENE OXIDE-BASED COMPOUND FOR AN AIR ELECTRODE OF A METAL-AIR BATTERY AND ASSOCIATED COMPOUND

(71) Applicants: ELECTRICITE DE FRANCE, Paris (FR); CENTRE NATIONAL DE LA RECHERCHE SCIENTIFIQUE—CNRS-, Paris (FR)

(72) Inventors: Philippe Stevens, Noisy Rudignon (FR); Gwenaelle Toussaint, Nemours (FR); Aurelien Louis Habrioux, Nouaille-Maupertuis (FR); Clement Aime Comminges, Vouille (FR); Boniface Kokoh, Poitiers (FR); Ismail Abidat, Poitiers (FR); Teko Wilhelmin Napporn, Mignaloux Beauvoir (FR); David Portehault, Kremlin Bicetre (FR); Emmanuelle Cazayus-Claverie, Ivry sur Seine (FR); Olivier Durupthy, Nogent sur Marne (FR); Corinne Chaneac, Bagnolet (FR)

(73) Assignees: ELECTRICITE DE FRANCE, Paris (FR); CENTRE NATIONAL DE LA RECHERCHE SCIENTIFIQUE—CNRS, Paris (FR)

( * ) Notice: Subject to any disclaimer, the term of this patent is extended or adjusted under 35 U.S.C. 154(b) by 234 days.

(21) Appl. No.: 16/769,344

(22) PCT Filed: Dec. 5, 2018

(86) PCT No.: PCT/FR2018/053125
§ 371 (c)(1),
(2) Date: Jun. 3, 2020

(87) PCT Pub. No.: WO2019/110933
PCT Pub. Date: Jun. 13, 2019

(65) Prior Publication Data
US 2020/0313185 A1    Oct. 1, 2020

(30) Foreign Application Priority Data

Dec. 7, 2017 (FR) .................................. 17 61794

(51) Int. Cl.
| | |
|---|---|
| *H01M 4/583* | (2010.01) |
| *H01M 4/04* | (2006.01) |
| *H01M 4/52* | (2010.01) |
| *H01M 4/58* | (2010.01) |
| *H01M 4/36* | (2006.01) |
| *H01M 12/06* | (2006.01) |

(52) U.S. Cl.
CPC ......... *H01M 4/583* (2013.01); *H01M 4/0471* (2013.01); *H01M 4/364* (2013.01); *H01M 4/52* (2013.01); *H01M 12/065* (2013.01)

(58) Field of Classification Search
None
See application file for complete search history.

(56) References Cited

U.S. PATENT DOCUMENTS

2018/0093893 A1* 4/2018 Dai .................... C01B 32/15

FOREIGN PATENT DOCUMENTS

KR  10-2017-0094872 A  8/2017

OTHER PUBLICATIONS

He et al., "High-Loading Cobalt Oxide Coupled with Nitrogen-Doped Graphene for Oxygen Reduction in Anion-Exchange-Membrane Alkaline Fuel Cells," Journal of Physical Chemistry C, ACS Publications, Apr. 19, 2013, vol. 117(17), pp. 8697-8707.
(Continued)

*Primary Examiner* — Tracy M Dove
(74) *Attorney, Agent, or Firm* — Faegre Drinker Biddle & Reath LLP (57) ABSTRACT

A method for producing a graphene oxide-based compound for an air electrode of a metal-air battery. A nitrogen and
(Continued)

sulfur-based organic compound is added to an aqueous suspension of a graphene oxide. The water of the suspension is evaporated in order to obtain a powder. This powder is heated under an inert atmosphere in order to sublime the organic compound and stimulate the incorporation of nitrogen from the organic compound into the graphitic sites of the graphene oxide. The nitrogen and sulfur-doped graphene oxide is added to a second aqueous suspension comprising a cobalt nitrate-based compound. This second suspension is heated in order to form nanoparticles of cobalt oxide at the surface of at least one nitrogen and sulfur-doped graphene oxide sheet.

6 Claims, 4 Drawing Sheets

(56) References Cited

OTHER PUBLICATIONS

Hummers et al., "Preparration of Graphitic Oxide," Journal of the American Chemical Society, Mar. 20, 1958, vol. 80(6), p. 1339.

Kumar et al., "Microwave-assisted synthesis of void-induced graphene-wrapped nickel oxide hybrids for supercapacitor applications," RSC Advances, Mar. 4, 2016, vol. 6(32), pp. 26612-26620.

Liang et al., "Sulfur and Nitrogen Dual-Doped Mesoporous Graphene Electrocatalyst for Oxygen Reduction with Synergistically Enhanced Performance," Angewandte Chemie International Edition, Nov. 12, 2012, vol. 51(46), pp. 11496-11500.

Ma et al., "Cobalt oxide anchored on nitrogen and sulfur dual-doped graphene foam as an effective oxygen electrode catalyst in alkaline media," Applied Materials Today, Apr. 3, 2017, vol. 4, pp. 1-8.

Neburchilov et al., "A review on air cathodes for zinc-air fuel cells," Journal of Power Sources, 2010, vol. 195, pp. 1271-1291.

Tang et al., "Highly Crumpled Hybrids of Nitrogen/Sulfur Dual-Doped Graphene and CO9S8 Nanoplates as Efficient Bifunctional Oxygen Electrocatalysts," ACS Applied Materials & Interfaces, Apr. 3, 2017, vol. 9(14), pp. 12340-12347.

Yang et al., "Identification of catalytic sites for oxygen reduction and oxygen evolution in N-doped graphene materials Development of highly efficient metal-free bifunctional electrocatalyst," Science Advances, Apr. 22, 2016, vol. 2(4), e150122, pp. 1-11.

Zhou et al., "Nitrogen and sulfur dual-doped graphene sheets as anode materials with superior cycling stability for lithium-ion batteries," Electrochimica Acta, Elsevier Science Publishes, Barking, GB, Oct. 24, 2015, vol. 184, pp. 24-31.

* cited by examiner

METHOD FOR PRODUCING A GRAPHENE OXIDE-BASED COMPOUND FOR AN AIR ELECTRODE OF A METAL-AIR BATTERY AND ASSOCIATED COMPOUND

CROSS-REFERENCE TO RELATED APPLICATIONS

This application is the U.S. national phase of the International Patent Application No. PCT/FR2018/053125, filed Dec. 5, 2018, which claims the benefit of French Patent Application No. 17 61794, filed Dec. 7, 2017, the entire content of which is incorporated herein by reference.

FIELD

The disclosure relates to the field of metal-air batteries, and more specifically to methods for producing graphene-based compounds for reversible air electrodes of metal-air batteries.

BACKGROUND

The storage of electrical energy in electrochemical form is the subject of considerable research focusing in part on improving existing batteries and developing new electrochemical storage means.

Lithium-ion batteries, widely used in portable electric devices, offer a high energy capacity and a long lifetime, on the order of 5000 charge-discharge cycles. However, these batteries have reached a maturation threshold that limits their use in applications requiring more electricity, such as in residential electricity storage, network storage or electric vehicles.

An alternative that is interesting and promising in terms of the performance/cost ratio is envisaged thanks to metal-air batteries.

Metal-air battery cells are generally composed of a negative electrode based on a metal such as zinc, iron or lithium, coupled to an air electrode. These two electrodes are generally in contact with an aqueous alkaline electrolyte.

When such a battery is discharging, oxygen is reduced at the positive electrode and the metal is oxidized at the negative electrode:

Discharge at the negative electrode: $M \rightarrow M^{n+} + ne^-$

Discharge at the positive electrode: $O_2 + 2H_2O + 4e^- \rightarrow 4OH^-$

The advantage of metal-air systems resides in the use of a positive electrode of infinite capacity; oxygen consumed at the positive electrode does not have to be stored in the electrode but can be taken from the surrounding air. Metal-air type electrochemical generators are therefore known for their high specific energies, which can reach several hundred Wh/kg.

Air electrodes are used, for example, in alkaline fuel cells, which are particularly advantageous compared to other systems due to the high reaction kinetics at the electrodes and due to the absence of noble metals such as platinum.

An air electrode is a porous solid structure, generally of carbon powder, in contact with the liquid electrolyte. The interface between the air electrode and the liquid electrolyte is a so-called "triple-contact" interface, where the active solid material of the electrode (this electrode also generally comprises a catalyst), the gaseous oxidant, i.e. air, and the liquid electrolyte are present simultaneously. The air electrode is usually composed of carbon powder with a high surface area, offering a large reaction surface area and therefore a high current density relative to the geometric surface area of the electrode. A large reaction surface area is advantageous to compensate for the difference between the density of gaseous oxygen and that of a liquid. For example, the molar density of oxygen in air is equal to approximately 0.03 mol/L compared to water which has a density of 55 mol/L. The large surface area of carbon makes it possible to multiply the reaction sites in the air electrode.

A description of different types of air electrodes for zinc-air batteries is presented, for example, in the bibliographic article by V. Neburchilov et al., entitled "A review on air cathodes for zinc-air fuel cells," Journal of Power Sources 195 (2010) p. 1271-1291.

When a metal-air battery must be recharged electrically, the direction of current is reversed. Oxygen is produced at the positive electrode and the metal is redeposited by reduction at the negative electrode:

Recharge at the negative electrode: $M^{n+} + ne^- \rightarrow M$

Recharge at the positive electrode: $4OH^- \rightarrow O_2 + 2H_2O + 4e^-$

It has been observed that the catalyst frequently used in air electrodes, manganese oxide, disintegrates in contact with the alkaline electrolyte of metal-air batteries and is found in the electrolyte. This effect is notably increased when the electrical potential applied to the electrode increases (notably in the recharging phase). Starting at +0.5 V relative to the redox potential of the Hg/HgO couple, and in an electrolyte with a pH greater than 13, manganese oxide $MnO_2$ transforms into $MnO_4^{2-}$ and then into $MnO_4^-$. In addition, the carbon grains of the air electrode structure corrode by oxidation during operation of the battery. This effect is all the greater when the potential applied to the electrode is high. Unfortunately, the conditions for this corrosion are systematically encountered when recharging the battery, since this recharging generally imposes a potential greater than 0.6 V for the discharge potential of the air electrode.

With a view to solving these problems, using a second positive electrode which is connected to the positive terminal of the battery only when charging the latter has been proposed. However, this solution requires a more complex battery design and additional connection points to manage the charge and discharge phases, and also presents the disadvantage of making the battery heavier and larger by adding an additional metal component to each cell.

Consequently, a compound that would prevent the damage to air electrodes mentioned above, as well as a method for producing such a compound, is sought.

SUMMARY

To respond to the problems stated above, proposed herein is a method for producing a graphene oxide-based compound for an air electrode of a metal-air battery, the method comprising:

preparing a first aqueous suspension of a graphene oxide in water;

adding a nitrogen- and sulfur-based organic compound to the aqueous suspension;

evaporating the water from the aqueous suspension so as to obtain a powder;

heating the powder under an inert atmosphere so as to sublime the nitrogen- and sulfur-based organic compound and to stimulate the incorporation of nitrogen from the nitrogen- and sulfur-based organic compound into the graphitic sites of the graphene oxide in order to obtain nitrogen- and sulfur-doped graphene oxide;

adding the nitrogen- and sulfur-doped graphene oxide to a second aqueous suspension comprising a cobalt nitrate-based compound;

heating the second aqueous suspension so as to form nanoparticles of cobalt oxide at the surface of at least one nitrogen- and sulfur-doped graphene oxide sheet, thus forming the graphene oxide-based compound for an air electrode of a metal-air battery.

This method enables an original compound to be produced, containing nitrogen- and sulfur-doped graphene oxide, and further comprising nanoparticles of cobalt oxide. This compound presents a high stability in alkaline media having a pH greater than 13, making it a compound of choice for an application in the porous structure of an air electrode of a metal-air battery.

The method enables the incorporation of nitrogen and sulfur into the graphene oxide to be better controlled, particularly due to the step of heating the graphene oxide powder. The conditions of this heating enable the proportion of graphitic sites occupied by nitrogen atoms in the graphene oxide to be substantially modified.

The incorporation of nanoparticles of cobalt oxide into such a nitrogen- and sulfur-doped graphene oxide further reinforces the electrochemical stability of the compound in an alkaline medium.

The method proposes in particular synthesizing nanoparticles of cobalt oxide directly in an aqueous solution containing the support comprising nitrogen- and sulfur-doped graphene oxide. This technique differs from the prior art, which generally proposes producing nanoparticles separately before causing them to react with a support in a subsequent step.

According to an embodiment, the powder can be heated under an inert atmosphere to a temperature of between 700° C. and 1100° C.

According to an embodiment, the powder can be progressively heated by increasing the temperature under an inert atmosphere at a rate of between 1° C. per minute and 20° C. per minute.

Such conditions for heating the graphene oxide powder in the presence of the sulfur- and nitrogen-based organic compound enable the nitrogen and sulfur speciation in the graphene oxide structure to be controlled. The term "speciation" refers to the different forms of possible bonds of a chemical element (in this instance, sulfur and nitrogen) in a given environment (in this instance, a graphene oxide sheet). The temperature and the temperature increase promote a progressive sublimation of the nitrogen- and sulfur-based organic compound, without destroying the graphene oxide. Such temperature conditions also promote graphitic speciation of the nitrogen.

According to an embodiment, the nitrogen- and sulfur-based organic compound can be thiourea.

Thiourea offers the advantage of being an organic compound that is easy to manipulate and produce, and in which the stoichiometric proportions of nitrogen and sulfur are suitable for producing the compound disclosed herein.

According to an embodiment, the second aqueous suspension can be heated to a temperature of between 80° C. and 150° C.

Such a temperature enables the creation of deposition conditions favorable for a homogeneous distribution of nanoparticles directly on the nitrogen- and sulfur-doped graphene oxide, while preventing a local agglomeration of nanoparticles.

According to an embodiment, the second aqueous suspension is heated in a microwave oven.

Microwave heating appears to promote a growth of cobalt oxide nanoparticles directly on the nitrogen- and sulfur-doped graphene oxide at a rate of close to 90%. Also, such a heating method leads to the creation of nanoparticles with a substantially spherical shape and a size of between 2 nm and 5 nm. This method particularly differs from the hydrothermal heating techniques that are widely used for producing cobalt oxide crystals, which then have larger sizes and do not attach to the sheets in as large of a proportion.

According to an embodiment, when the second aqueous solution is heated, a proportion of between 80% and 95% of the cobalt nitrate-based compound can attach in the form of cobalt oxide nanoparticles to the surface of the at least one graphene oxide sheet.

According to an embodiment, the method may also comprise:

incorporating the graphene oxide-based compound for an air electrode of a metal-air battery into a porous air electrode structure.

When it is incorporated into an air electrode, the compound obtained by the method described above reduces the weight of an air electrode by half compared to a conventional electrode using a manganese oxide catalyst instead. In addition, the compound is stable in cycling and does not deteriorate in the presence of an alkaline electrolyte with a highly basic pH (greater than 13), widely used in metal-air batteries.

Also disclosed is a graphene oxide-based compound for an air electrode of a metal-air battery, obtained by the method described above.

Such a compound comprises at least one sheet of oxidized graphene oxide doped with nitrogen and sulfur heteroatoms and comprising nanoparticles of cobalt oxide on a surface of the at least one sheet of oxidized graphene oxide doped with nitrogen and sulfur heteroatoms.

This compound offers the advantage of being light and stable in an alkaline medium. In addition, it does not degrade during the variations in potential that battery electrodes undergo, particularly a reversible air electrode of a metal-air battery in which it may be used instead of manganese oxide dispersed on a carbon powder such as carbon black. The nitrogen heteroatoms present in the carbonaceous structure of the graphene oxide modify the density of charges (making it positive) on the adjacent carbon atoms, which then form sites facilitating both the adsorption of oxygen species (such as dioxygen in the air used in metal-air batteries or hydroxyl ions), and their transformation into an oxidation and reduction product.

In particular, nitrogen doping significantly increases the activity of graphene oxide during the dioxygen reduction reaction. Sulfur doping increases this effect, and also contributes to better stability in an alkaline medium and during cycling in a metal-air battery. This effect of improving electrochemical stability in an alkaline medium and during cycling is increased by the presence of cobalt oxide nanoparticles.

Cobalt oxide nanoparticles improve the electrical performance of the compound during water oxidation reactions, for example when charging a battery.

In addition, the electrical conduction properties of graphene oxide combined with the electrocatalytic properties of cobalt oxide nanoparticles facilitate the charge transfer at the interface between oxygen species and the structure of the compound. Utilized in an air electrode, this enables the charges to be channeled effectively between the reaction sites on the air electrode and the battery.

Such a compound, used in an air electrode of a metal-air battery, makes it possible to reduce the weight of the air electrode by about 50% and to reduce energy losses in metal-air battery cycling by approximately 30%.

According to an embodiment, nitrogen may represent a proportion of between 3 and 5 atomic percent in the at least one sheet, sulfur may represent a proportion of between 0.4 and 0.8 atomic percent in the at least one sheet, oxygen may represent a proportion of between 1.2 and 1.6 atomic percent in the at least one sheet and carbon may represent a proportion of between 97.4 and 98 atomic percent in the at least one sheet.

The nitrogen heteroatoms bring p and n type semiconductor properties to the graphene sheets, which are favorable for oxygen reduction reactions (ORR) and oxygen evolution reactions (OER) (Identification of catalytic sites for oxygen reduction and oxygen evolution in N-doped graphene materials: Development of highly efficient metal-free bifunctional electrocatalyst, Hong Bin Yang et al. Sci. Adv. 2016; 2: e1501122). For example, p-type domains created by pyridinic-N heteroatoms accept adjacent carbon electrons, thereby facilitating the adsorption of $OH^-$ and $OOH^-$ type intermediates from the oxidation reaction (OER) in alkaline medium. In addition, p-type domains from graphene accept the electrons from the $OH^-$ species adsorbed at the surface, thereby accelerating the intermediate step $OH^- \rightarrow OH^-_{adsorbed}$.

A proportion of nitrogen of between 3 and 5 atomic percent in the at least one graphene oxide sheet is favorable for oxygen reduction reactions (ORR) and oxygen evolution reactions (OER) in alkaline medium, thus improving the catalytic activity of the graphene oxide-based compound.

According to an embodiment, the nitrogen heteroatoms may occupy graphitic, pyrrolic and pyrinidic sites in the at least one sheet in the following proportions: Between 15% and 50% of graphitic sites, between 25% and 25% of pyrrolic sites, between 30% and 40% of pyrinidic sites and between 10% and 20% of $NO_x$ type groups.

Such nitrogen atom speciation, particularly with the presence of graphitic nitrogen in proportions that can reach more than 30%, contributes to creating the electronic conditions allowing oxygen species to react on a major portion of the surface area of the graphene oxide, and not only on its edges.

According to an embodiment, a proportion of between 70% and 80% of the sulfur heteroatoms can be distributed in the form of carbon-sulfur-carbon C—S—C groups or carbon-sulfur-hydrogen C—S—H groups, and a proportion of between 20% and 30% of the sulfur heteroatoms can be distributed in the form of $C-SO_n$ type groups.

The presence of sulfur heteroatoms further increases the polarization of the carbon. Therefore, the presence of sulfur heteroatoms further improves the catalytic activity of the graphene oxide-based compound, both for the oxygen reduction reaction (ORR) and the oxygen evolution reaction (OER).

According to an embodiment, the cobalt oxide nanoparticles may be distributed in a substantially homogeneous manner over the at least one graphene oxide sheet, and the average distance between two cobalt oxide nanoparticles on the at least one graphene oxide sheet may be between 0.5 nm and 3 nm.

This substantially homogeneous distribution of cobalt oxide nanoparticles on the support formed by the nitrogen- and sulfur-doped graphene oxide also contributes to making this compound efficient in an application as a catalyst of an air electrode for a metal-air battery. In fact, as the nanoparticles are not agglomerated, but are distributed over the entire graphene oxide surface, the compound offers a higher quantity of reaction sites. This enables the quantity of compound used in an air electrode to be reduced, further contributing to reducing its weight.

According to an embodiment, the cobalt oxide nanoparticles have a substantially spherical shape and a size of less than 10 nm, preferably between 2 nm and 5 nm on the at least one sheet, and preferentially 4 nm.

According to an embodiment, the cobalt oxide nanoparticles represent between 40% and 60% of the mass of the compound.

Cobalt oxide promotes the oxygen evolution reaction (OER). In addition, cobalt oxide nanoparticles having a size of less than 10 nm, preferably between 2 nm and 5 nm on at least one sheet, enable a compound to be obtained that is stable and that sufficiently covers the graphene surface without covering it completely, thereby avoiding blocking any oxygen reduction reaction (ORR). In particular, the use of cobalt oxide nanoparticles of 4 nm is particularly advantageous.

The disclosure also proposes an air electrode comprising a compound such as described above.

The disclosure also relates to a metal-air battery comprising at least one air electrode such as described above.

BRIEF DESCRIPTION OF THE DRAWINGS

The method disclosed herein will be better understood by reading the following description of some examples of embodiments presented for illustrative purposes, without limitation, and by observing the drawings below in which.

For reasons of clarity, the dimensions of the different elements represented in these figures are not necessarily in proportion with their real dimensions. In the figures, identical references correspond to identical elements.

DETAILED DESCRIPTION

The present disclosure proposes an original method for producing a compound usable for improving the lifetime, optimizing the structure and reducing the weight of air electrodes for metal-air batteries. In particular, when the compound from the method is incorporated into an air electrode for metal-air batteries, the air electrode displays an equivalent or even better electrical performance than that of electrodes using manganese oxide as a catalyst, but does not encounter the degradation problems observed in air electrodes from the prior art during cycling. The term "cycling" refers to the periodic charges and discharges that take place during operation of the metal-air battery.

In addition, by integrating the compound of the present disclosure into an air electrode of a metal-air battery, using solid or gelled electrolytes in metal-air batteries becomes possible, thereby avoiding the maintenance requirements that appear when using liquid electrolytes. A solid or gelled electrolyte is particularly advantageous for application in portable systems.

The compound presented below may also be used for other applications, particularly those in which an electrochemical resistance to alkaline pHs typically greater than 13 is sought.

Figure 1:
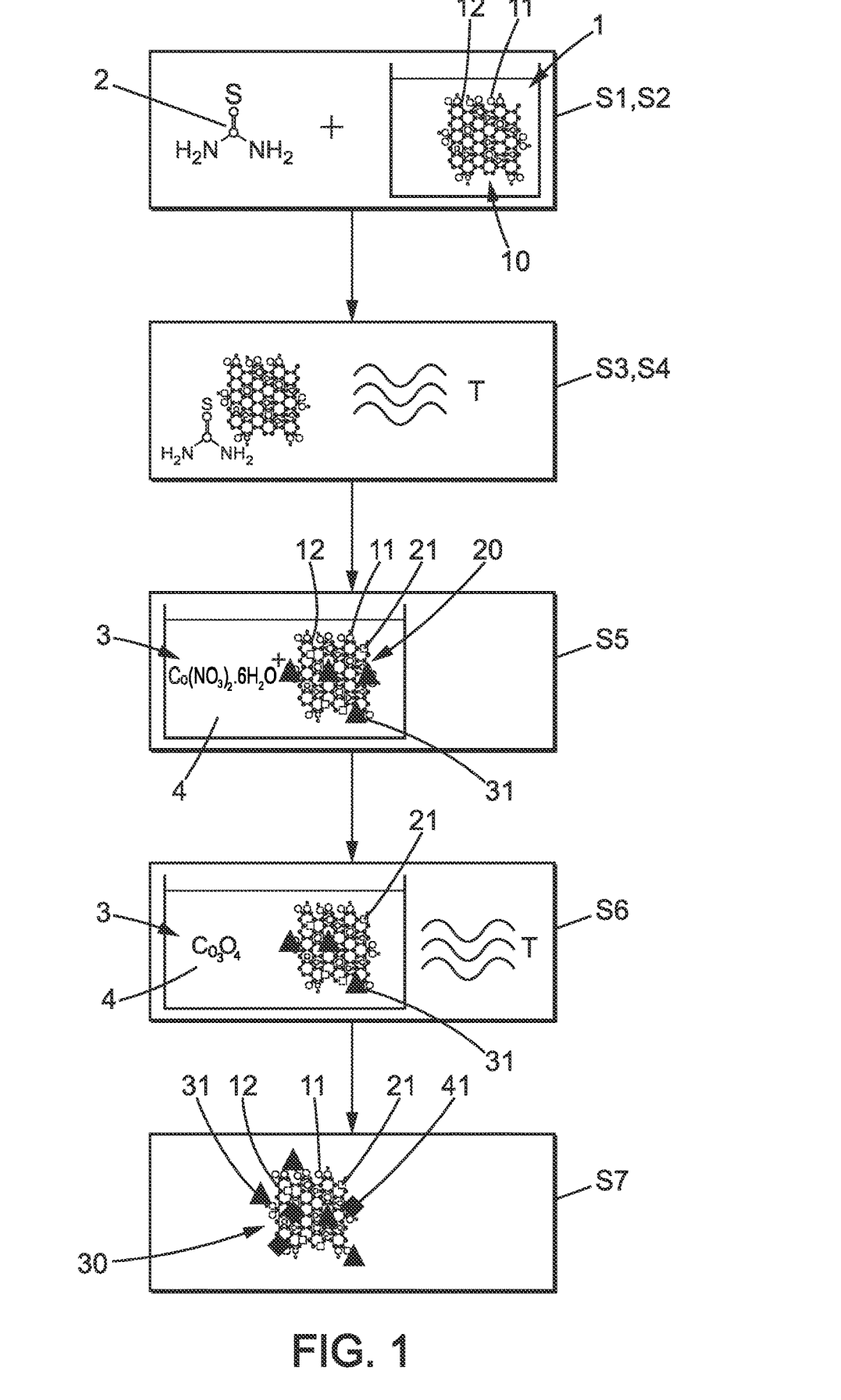
FIG. 1 is a flowchart representing the steps of the method for producing a graphene oxide-based compound for an air electrode of a metal-air battery.

FIG. 1 schematically illustrates several steps of a method for producing a compound according to an embodiment.

In a first step S1, a first aqueous solution 1 of a graphene oxide 10 is obtained. This step may be carried out by using a known graphene oxide synthesis technique, such as for example the "Hummers" method described in the document Hummers, William S.; Offeman, Richard E. (Mar. 20, 1958). "*Preparation of Graphitic Oxide*," Journal of the American Chemical Society. 80 (6): 1339.

This method enables a graphite oxide to be obtained that can then be exfoliated in an ultrasonic bath in order to prepare the graphene oxide used in step S1.

The first aqueous solution 1 may typically contain water and several sheets of graphene oxide.

In a second step S2, a nitrogen- and sulfur-based organic compound 2 is added to the aqueous suspension 1. This compound may, for example, be chosen from among thiourea or thiourea derivatives. The water of the first aqueous suspension is evaporated during mechanical stirring by heating in an oil bath in order to obtain a powder 5 comprising sheets of graphene oxide.

During the following steps S3 and S4, the powder 5 is heated in an oven to temperatures of typically between 700° C. and 1100° C. under an inert atmosphere (for example, argon) for approximately 2 hours. This step enables the nitrogen and the sulfur of the nitrogen- and sulfur-based compound 2 to be inserted into the graphene oxide. The oven progressively rises in temperature to promote the incorporation of nitrogen preferentially into the graphitic sites of the graphene oxide.

The obtained intermediate compound 20 based on nitrogen-21 and sulfur-31 doped graphene oxide is added to a second aqueous suspension 3 comprising a water/ethanol mixture in a 50/50 ratio in step S5. Cobalt oxide 4 or cobalt nitrate hexahydrate is added to the second aqueous suspension. Ammonium hydroxide may be added to the second aqueous suspension 3 which is then heated to a temperature of 100° C. for approximately 10 minutes so as to promote the growth of cobalt oxide nanoparticles 41 on a surface of at least one nitrogen- and sulfur-doped graphene oxide sheet, in step S6.

According to a particularly advantageous embodiment, the second aqueous solution can be heated by microwave heating, while the prior art generally uses hydrothermal heating. Microwave heating appears to contribute to the formation of spherical cobalt oxide nanoparticles 41 having a size of between 2 nm and 5 nm, directly on the surface of a nitrogen- and sulfur-doped graphene oxide sheet, with a homogeneous distribution on this surface.

The compound 30 thus obtained in step S7 comprises graphene oxide sheets comprising nitrogen heteroatoms 21, sulfur heteroatoms 31 and cobalt oxide nanoparticles 41 distributed in a substantially uniform manner on the surface of the sheets.

The method according to an embodiment disclosure naturally leads to the formation of a compound 30 in which nitrogen 21 represents up to 4 atomic percent of a sheet of compound 30, and occupies different sites in the sheet. In particular, it has been observed that after steps S3 and S4, nitrogen 21 occupies between 15% and 50% of graphitic sites, between 25% and 35% of pyrrolic sites and between 30% and 40% of pyrinidic sites in compound 30. It should be noted that nitrogen 21 doping may lead to a distribution of nitrogen either on the edges of the graphene oxide sheet, or by replacing carbon atoms in the sheet itself.

Sulfur 31 occupies up to 0.6% atomic percent of a sheet of compound 30, oxygen occupies approximately 1.4% atomic percent of a sheet of compound 30 and carbon occupies approximately 93.7% atomic percent.

The sulfur atoms in compound 30 are present at 76% in the form of C—S—C or C—S—F groups and 24% in the form of C—SO$_n$ type groups.

Figure 2:
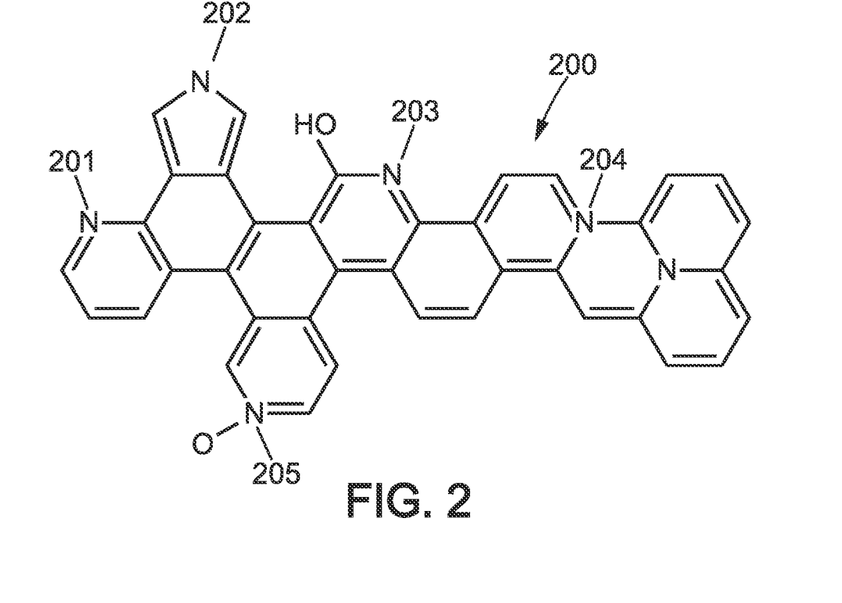
FIG. 2 is a schematic representation of a sheet of nitrogen-doped graphene, integrated into the sheet so as to occupy different sites within the sheet: graphitic, pyrrolic and pyrinidic sites.

FIG. 2 schematically represents a two-dimensional plane of nitrogen-doped graphene 200. This figure illustrates an example of a graphitic site 201, an example of a pyrrolic site 202, an example of a pyrinidic site 203, a pyridinium 204 and a pyridine-N-oxide nitrogen 205.

Figure 3:
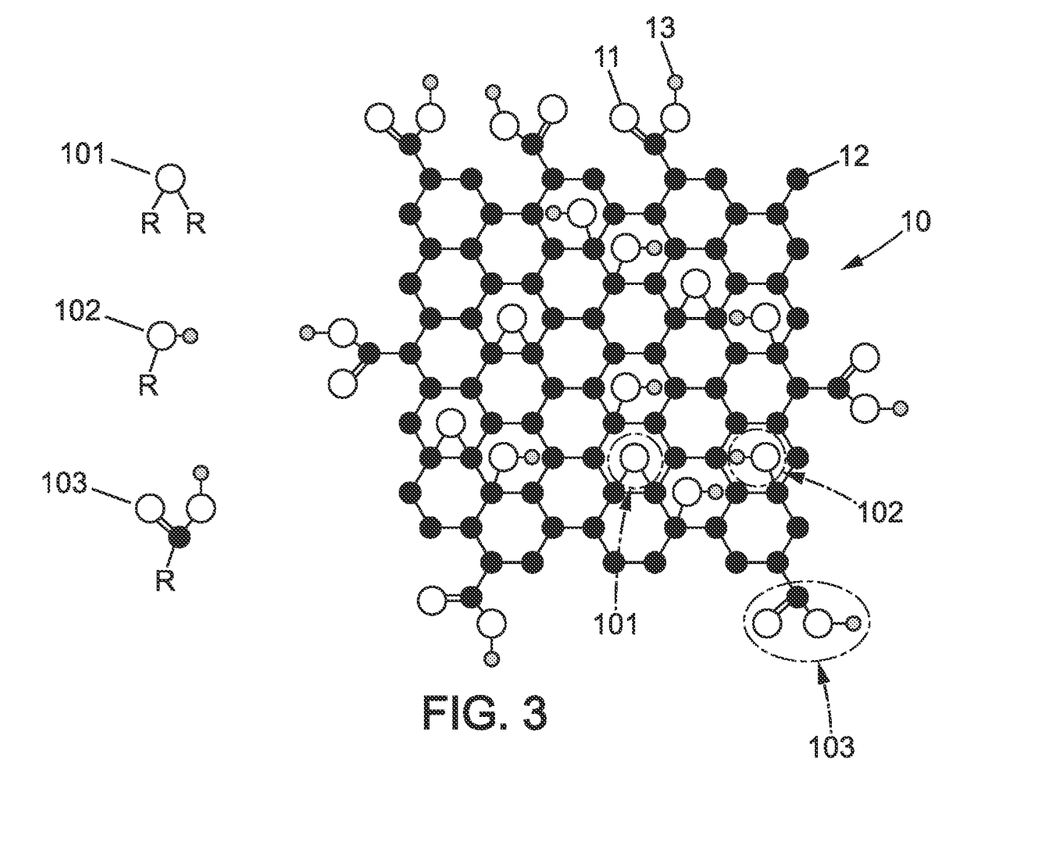
FIG. 3 is a schematic representation of a sheet of graphene oxide identifying different possible configurations for binding oxygen to the carbon in the sheet.

FIG. 3 schematically represents a sheet of graphene oxide 10 comprising carbon atoms 12, oxygen atoms 11 and hydrogen atoms 13. The oxygen can typically form three different chemical bonds in the graphene. A first bond type 101 consists of forming an epoxide group. A second bond type 102 consists of forming a hydroxyl group. A third bond type 103 consists of forming a carboxyl group.

Figure 4:
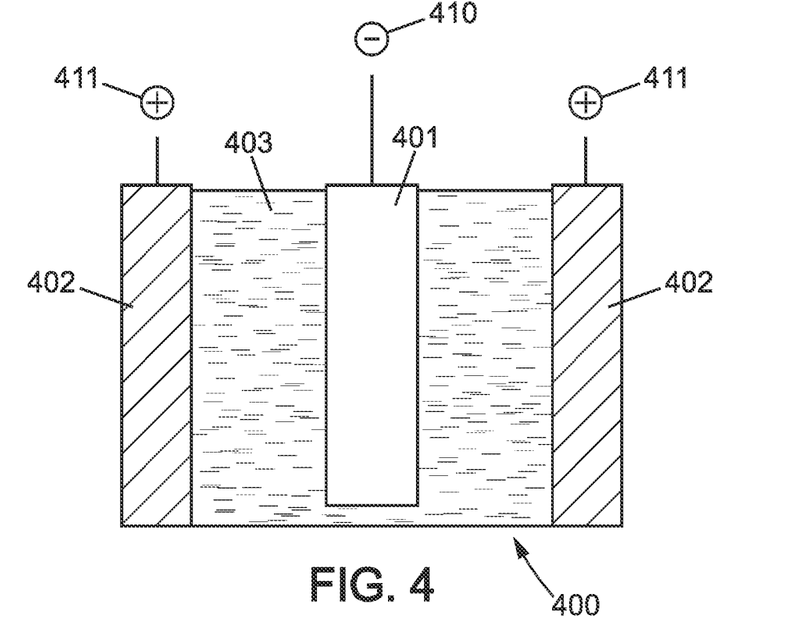
FIG. 4 is a schematic representation of a metal-air battery comprising an air electrode produced from the compound.

FIG. 4 schematically illustrates a metal-air battery 400 comprising a negative terminal 410, and at least one positive terminal 411. The battery comprises an electrolyte 403 separating a negative electrode 401 from at least one positive electrode 402. The positive electrode 402 is, in the case of the disclosure, an air electrode comprising the compound 30 described above in its structure.

Exemplary Embodiment

First, the graphite oxide is synthesized according to Hummers' method mentioned above. This technique comprises the following steps:

The precursor material is a commercial graphite powder (with grain sizes of less than 20 μm). The graphite powder (typically 3 g) is dispersed in a sulfuric acid solution (46 mL) with magnetic stirring for 10 min. Sodium nitrate (1.5 g) is added to the suspension. The mixture is mechanically stirred for 10 min. The entire process is carried out at 20° C. The suspension is then cooled using an ice bath. 9 g of potassium permanganate are then added to the suspension, while magnetic stirring is still maintained. The entire mixture is then brought to 35° C. for 30 min using oil bath heating. A quantity (for example 10 mL) of pure water is added to the mixture. The temperature of the oil bath is then brought up to 98° C. for 15 min. The mixture is then cooled using an ice bath. 420 mL of water, then 5 mL of hydrogen peroxide are then added to the reaction mixture. The suspension is magnetically stirred for 30 min.

The material then undergoes a recovery and washing protocol. The suspension is centrifuged for 15 min at a radial centrifugal acceleration (RCA) of 2744 g and at a controlled temperature of 5° C. The supernatant is eliminated following the centrifugation step. The centrifugation residue is resuspended in a hydrochloric acid solution. The suspension is centrifuged again for 15 min at an RCA of 2744 g and at a controlled temperature of 5° C. This washing operation is repeated twice. The same washing operation is repeated 5 times by replacing the hydrochloric acid with pure water, but this time at a temperature of 20° C. Following the washing step, the solid is oven-dried (at a typical temperature of 40° C.) for 48 hr. The powder is then manually ground in a mortar.

After implementing Hummers' technique described above, the graphene oxide sheets are doped with nitrogen, sulfur and cobalt oxide nanoparticles.

The graphene oxide is first exfoliated by the application of ultrasound waves. An aqueous suspension (pure water, volume 200 mL) containing a concentration of 1 mg/mL of the solid previously obtained is first created. The suspension is placed in an ultrasonic bath (800 W) for 1 hr. To the initially prepared suspension, 8 mg/mL of thiourea are added. The suspension is then mechanically stirred for 30 min. The water is then evaporated during mechanical stirring by heating in an oil bath at 100° C. A thermal treatment of the powder thus obtained is then carried out at 700° C. in an argon atmosphere for 2 hr. The rise in temperature of the oven is 10° C./min. The oven is then cooled by inertia.

The deposition of cobalt oxide nanoparticles (also known as Co-based nanostructured spinels) onto the surface of a nitrogen- and sulfur-doped graphene oxide sheet may be carried out by the method described below.

The powder of reduced graphene oxide doped with sulfur and nitrogen atoms (N,S-RGO for "nitrogen, sulfur and reduced graphene oxide"), obtained following the synthesis steps described in the previous paragraph, is redispersed into a mixture of pure water/ethanol in a 50/50 ratio by volume, at a concentration of 1 mg of powder per milliliter of liquid. This suspension is magnetically stirred for 24 hr in order to ensure dispersion of the reduced and doped graphene oxide sheets in the water/ethanol mixture. The suspension is then placed in an ultrasonic bath for 1 hr, to ensure that the exfoliation of the material is maintained. Immediately following the application of ultrasound waves, 0.130 g of cobalt nitrate hexahydrate is added to 20 mL of the N,S-RGO suspension. The mixture, which has a pink supernatant after the addition of cobalt salt, is mechanically stirred for 10 minutes. 2.5 mL of an 11% ammonium hydroxide aqueous solution are then added to the suspension, while continuing to stir. The color of the supernatant turns green following the addition of ammonium hydroxide.

The 20 mL of suspension are transferred into a 30 mL glass reactor for a single-mode microwave oven. The synthesis temperature is controlled by a temperature probe (for example, a ruby insertion probe). After the temperature rises in a few seconds until 100° C. is reached within the reaction medium, this temperature is kept constant for 10 minutes. The reactor is then cooled in the microwave oven by a flow of compressed air for several minutes.

After this last synthesis step, which enabled the formation of cobalt oxide nanoparticles grafted to the surface of the N,S-RGO sheets, the material is obtained in the form of an unstable suspension that sediments in a few seconds. It then undergoes a recovery and washing protocol. The suspension is centrifuged at an RCA of 29220 g for 30 minutes. The supernatant is then eliminated. The black powder remaining on the wall of the tube is then resuspended in pure water. This washing operation is repeated until the pH of the supernatant reaches a value of between 7 and 7.5. Lastly, the solid is dried under vacuum at 45° C. for 12 hr and the recovered powder is manually ground in a mortar.

Figure 5:
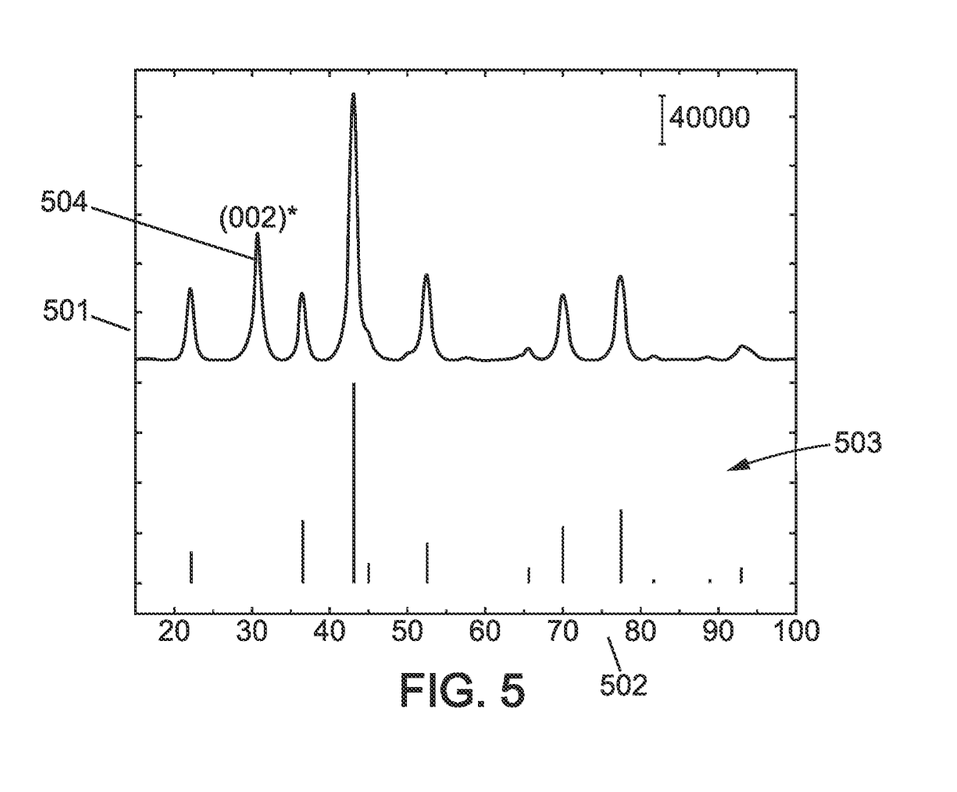
FIG. 5 is an X-ray diffractogram of the cobalt oxide nanoparticles on the surface of sheets of nitrogen- and sulfur-doped reduced graphene oxide.

The material is characterized by X-ray diffraction. The results of this characterization are indicated in FIG. 5, which represents an X-ray diffractogram of $Co_3O_4$ on the nitrogen- and sulfur-doped graphene oxide. The y-axis 501 represents the intensity of the signal detected by diffractometry, and the x-axis 502 represents the orientation angle of the X-ray beam, 2-theta. The reference peaks (indicated by lines 503) show a single $Co_3O_4$ crystalline phase as well as the presence of a small quantity of stacked RGO sheets, evidenced by a large peak 504 at approximately 31° (2-theta Lambda Co Kα). The morphology is characterized by transmission electron microscopy. The monocrystalline $Co_3O_4$ particles have a spherical shape and a diameter varying from between 2 and 5 nm. A distinctive feature of the material is the selective deposition of $Co_3O_4$ nanoparticles on the N,S-RGO sheets: The proportion of unsupported nanoparticles is very low, less than approximately 10% by number. Lastly, the loading rate is estimated to be 50% by mass (ratio of the mass of supported nanoparticles to the total mass of the material, considering that 90% of the particles are effectively deposited on the RGO) by thermogravimetric analysis.

Figure 6:
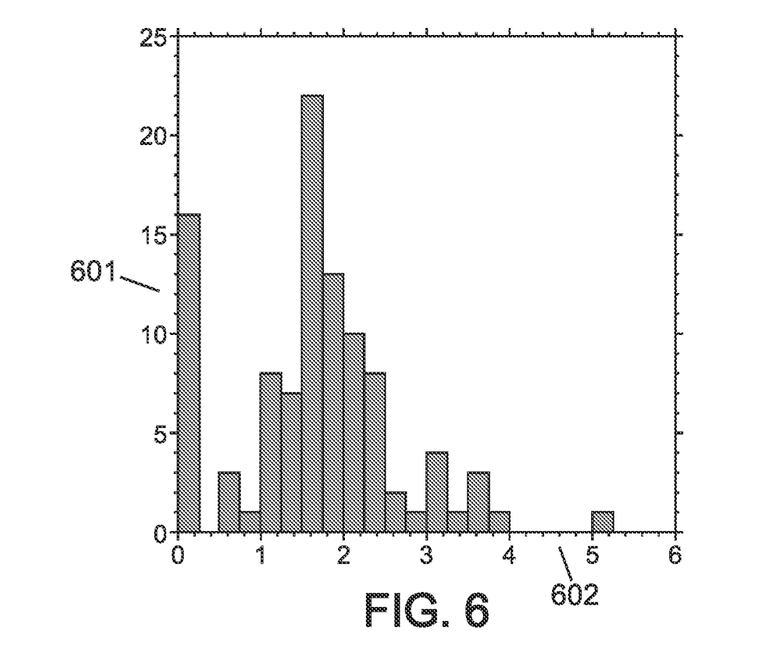
FIG. 6 represents a histogram of the distances separating two nearest-neighbor cobalt oxide nanoparticles, showing a homogeneous distribution of cobalt oxide nanoparticles on the nitrogen- and sulfur-doped graphene oxide sheets.

In addition, FIG. 6 shows that the nanoparticles are distributed in a substantially homogeneous manner on each nitrogen- and sulfur-doped graphene oxide sheet. Axis 601 of FIG. 6 represents the percentage of nanoparticles while axis 602 represents the distance in nanometers separating two nearest-neighbor cobalt oxide nanoparticles. In FIG. 6, it appears that 80% of the distances separating two nearest-neighbor cobalt oxide nanoparticles 41 are between 0.5 nm and 3 nm, and only 16% of the nanoparticles are aggregated.

Characterization of the Compound Obtained

Experiments have been carried out in view of verifying the electrical properties and the chemical stability of an air electrode obtained by incorporating the compound 30 described above. A test example is presented below.

Electrochemical measurements to evaluate the catalytic properties of the material with respect to the dioxygen evolution and reduction reactions are carried out using a potentiostat. The measurements are conducted in an aqueous electrolysis medium composed of potassium hydroxide at the 1 mol/L concentration. The measurements are carried out in a 50-mL 3-electrode electrochemical cell. A saturated calomel reference electrode is used. A counter electrode composed of a glassy carbon plate is used. The electrolyte is previously saturated with oxygen for 30 min. The electrolyte (100 mL) is made by dissolving 6.4 g of potassium hydroxide pellets in pure water.

To make the electrodes, an ink is first made. This ink is composed of 750 µL pure water, 250 µL isopropanol and 60 µL of a solution of 5% Nafion® by mass in a mixture of aliphatic alcohols and 5 mg of powder of the previously synthesized material. The electrochemical measurements are carried out under quasi-stationary conditions by using a rotating disk electrode. Measurements aiming to determine the activity of the material with respect to the dioxygen reduction reaction are carried out at rotation speeds of the rotating disk electrode of 400, 900, 1600 and 2500 rotations per minute in the potential range of between 1 and 0.25 V/HRE (HRE designating the hydrogen reference electrode) at a linear rate of variation of the potential of 5 mV/s. Measurements aiming to determine the activity of the material with respect to the dioxygen evolution reaction are carried out at a rotation speed of the rotating disk electrode of 1600 rotations per minute in the potential range of between 1 and 1.8 V/HRE at a linear rate of variation of the potential of 5 mV/s. Once the polarization curves are obtained, the reversibility condition is determined by calculating the difference in potential between the potential required to have a current density of 10 mA/cm$^2$ during the dioxygen evolution reaction and the potential required to have a current density of −1 mA/cm$^2$ during the reduction reaction. A reversibility condition of 0.78 V is obtained for the composite material comprising a carbon loading rate of 50%.

An evaluation of the stability of the materials was subsequently carried out by means of an air electrode. This electrode comprises a Teflon body. The electrical connection is ensured by a gold wire. The conductive mechanical support used for depositing the catalyst is a nickel foam that was previously treated by immersion in a hydrochloric acid solution at 6 mol/L for 30 min. The foam is then washed and oven-dried at 80° C. A catalytic ink composed of 54 μL of a 60% aqueous PTFE solution, 2 mL of ethanol and 8 mg of catalytic powder is made.

The ink is homogenized by using an ultrasonic bath at 800 W for 1 hr. The nickel foam is impregnated with the catalytic ink by immersion or dip coating. The mass of the deposited catalyst is verified by weighing. The stability of the catalytic material during cycling is then evaluated in an aqueous electrolysis medium containing an electrolyte consisting of potassium hydroxide at the 6 mol/L concentration. Electrochemical measurements by chronopotentiometry are carried out by using a potentiostat in a 50-mL 3-electrode electrochemical cell. A saturated silver chloride reference electrode is used. A counter electrode consisting of a glassy carbon plate is used. Current densities of −8 mA/cm$^2$ and 10 mA/cm$^2$ are respectively applied during the discharge and charge cycles. The charge and discharge cycles have respective durations of 8 and 12 hr and the total duration of the test is 214 hr.

Figure 7:
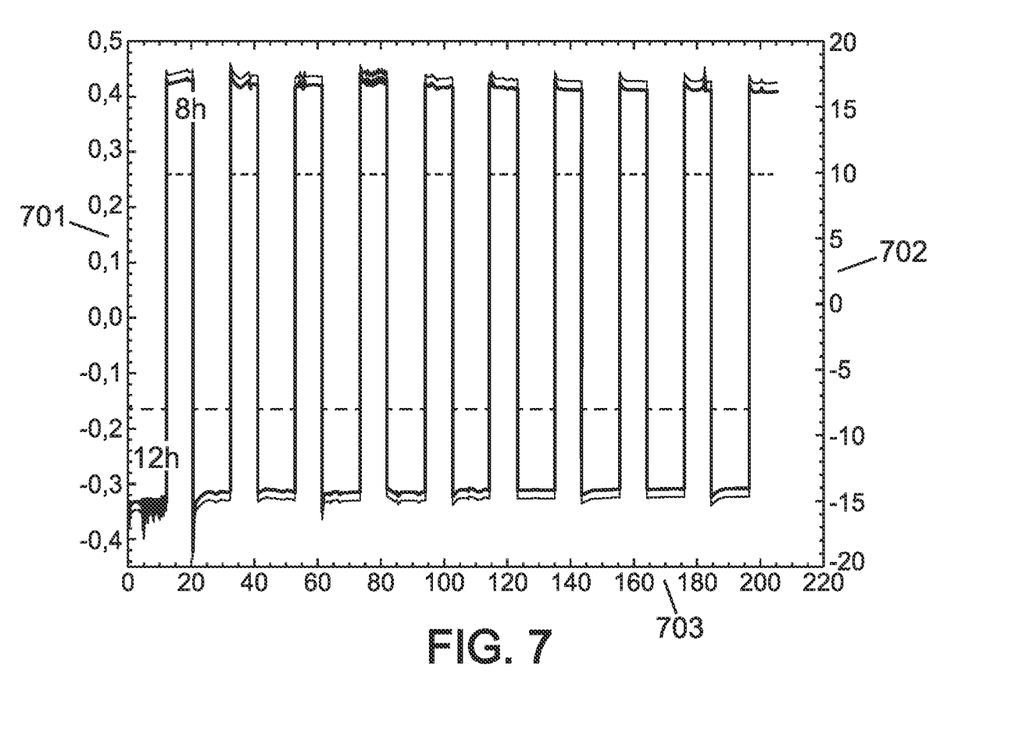
FIG. 7 is a graph showing the repeatability of the electrical behavior of an air electrode comprising the compound that is the object of the disclosure during cycling.

FIG. 7 illustrates the results of these cycling tests, carried out by alternately applying current densities of −8 mA/cm$^2$ (for 12 hr) and 10 mA/cm$^2$ (for 8 hr). Axis 701 designates the potential measured in relation to the Ag/AgCl/KCl couple (saturated) in Volts. Axis 702 designates the current density measured in mA/cm$^2$ and axis 703 designates the time in hours. This figure shows that the air electrode comprising the compound 30 described above does not undergo degradations during cycling, and maintains the same electrical performance even after several charge/discharge cycles.

A second test was carried out on electrodes containing the material that is the subject of the disclosure bound with PTFE only on a nickel grid. These electrodes were cycled at +30 mA/cm$^2$ and −30 mA/cm$^2$ in ambient air in a solution of 8 mol/L of KOH. No degradation was observed over 50 cycles.

Measurements of the electrode carried out by in situ infrared to detect the presence of carbonate or of carbonyl groups show that there is no oxidation of the doped graphene oxide prepared by the disclosure, even at high oxygen evolution potentials (>1.65V vs HRE) over 3000 hr of operation.

The invention claimed is:

1. A method for producing a graphene oxide-based compound for an air electrode of a metal-air battery, the method comprising:
preparing a first aqueous suspension of a graphene oxide in water;
adding a nitrogen- and sulfur-based organic compound to the first aqueous suspension;
evaporating the water from the first aqueous suspension so as to obtain a powder;
heating the powder under an inert atmosphere so as to sublime the nitrogen- and sulfur-based organic compound and to stimulate the incorporation of nitrogen from the nitrogen- and sulfur-based organic compound into graphitic sites of the graphene oxide in order to obtain nitrogen- and sulfur-doped graphene oxide;
adding the nitrogen- and sulfur-doped graphene oxide to a second aqueous suspension comprising a cobalt nitrate-based compound;
heating the second aqueous suspension so as to form nanoparticles of cobalt oxide at a surface of at least one nitrogen- and sulfur-doped graphene oxide sheet, thus forming the graphene oxide-based compound for the air electrode of the metal-air battery,
wherein the nitrogen- and sulfur-based organic compound is thiourea.

2. The method according to claim 1, wherein the powder is heated under the inert atmosphere to a temperature of between 700° C. and 1100° C.

3. The method according to claim 1, wherein the powder is progressively heated by increasing the temperature under the inert atmosphere at a rate of between 1° C. per minute and 20° C. per minute.

4. The method according to claim 1, wherein the second aqueous suspension is heated to a temperature of between 80° C. and 150° C.

5. The method according to claim 1, wherein the second aqueous suspension is heated in a microwave oven.

6. The method according to claim 1, wherein the method also comprises:
incorporating the graphene oxide-based compound for the air electrode of the metal-air battery into a porous air electrode structure.

* * * * *